(12) United States Patent
Maag et al.

(10) Patent No.: US 6,534,130 B1
(45) Date of Patent: Mar. 18, 2003

(54) METHOD FOR MULTI-LAYERED COATING OF SUBSTRATES

(75) Inventors: Karin Maag, Inzlingen (DE); Helmut Löffler, Brühl (DE); Werner Lenhard, Wuppertal (DE); Christine Kurz, Solingen (DE); Frank-Jürgen Krumpolt, Wuppertal (DE); Volker Rekowski, Bochum (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/555,176

(22) PCT Filed: Nov. 5, 1998

(86) PCT No.: PCT/EP98/07070

§ 371 (c)(1), (2), (4) Date: Aug. 21, 2000

(87) PCT Pub. No.: WO99/26732

PCT Pub. Date: Jun. 3, 1999

(30) Foreign Application Priority Data

Nov. 20, 1997 (DE) .......................... 197 51 479
Dec. 20, 1997 (DE) .......................... 197 57 083

(51) Int. Cl.$^7$ ................................. C08F 2/46
(52) U.S. Cl. ............... 427/492; 427/256; 427/287; 427/385.5; 427/388.1; 427/407.1; 427/409; 427/500; 427/504; 427/508; 427/514; 427/551; 427/552; 427/555; 427/558; 427/559

(58) Field of Search ............... 427/492, 500, 427/504, 508, 514, 551, 552, 555, 558, 559, 256, 287, 385.5, 388.1, 407.1, 409

(56) References Cited

U.S. PATENT DOCUMENTS

| | | | |
|---|---|---|---|
| 4,212,901 A | 7/1980 | van Neerbos et al. | 427/53.1 |
| 4,668,529 A | 5/1987 | Blair | 427/54.1 |

FOREIGN PATENT DOCUMENTS

| | | |
|---|---|---|
| CA | 2079498 | 4/1993 |
| EP | 0 247 563 | 12/1987 |
| GB | 2210291 A * | 6/1989 |
| GB | 2262055 A * | 6/1993 |

* cited by examiner

Primary Examiner—Bernard Pianalto

(57) ABSTRACT

A process for the preparation of a multi-layer coating wherein a colour- and/or special effect-imparting base lacquer coating compound is applied to a substrate optionally precoated with a primer and/or primer surfacer coating compound and/or further coating compounds and a clear lacquer layer is then applied to the colour- and/or special effect-imparting base lacquer layer, wherein the colour- and/or special effect-imparting base lacquer coating compound used is one which contains binders which can be cured by free-radical and/or cationic polymerisation under the action of high-energy radiation.

10 Claims, No Drawings

METHOD FOR MULTI-LAYERED COATING OF SUBSTRATES

The invention relates to a process for the multi-layer coating of substrates with a colour-and/or special effect-imparting base lacquer and a clear lacquer layer, which finds application in particular in the field of vehicle and vehicle part coating and more particularly repair coating.

Multi-layer vehicle refinishing generally comprises a base lacquer/clear lacquer top coating, which may be applied to substrates optionally precoated with primers, primer surfacers or further coating compounds.

For ecological reasons, attempts are also being made to reduce the solvent emission of coating compounds in vehicle refinishing. More particularly, a reduction in the solvent content in base lacquers, particularly in special effect base lacquers which, with about 80 wt. %, have a high proportion of organic solvents, makes an effective contribution to lowering the solvent emission of the coating as a whole. Waterborne base lacquers for use in vehicle refinishing have already been developed. The coatings obtained with said waterborne base lacquers do not yet correspond, however, with the level of properties of conventional base lacquers in all respects. For example, water resistance, hardness and inter-layer adhesion are still insufficiently well developed. Moreover, a longer drying time has to be accepted when waterborne base lacquers are used, which impairs the efficiency, for example, in a paint shop.

It is already known to use coating compounds which can be cured by high-energy radiation in vehicle coating.

EP-A-000 407 describes radiation-curing coating compounds based on an OH-functional polyester resin esterified with acrylic acid, a vinyl compound, a photoinitiator and a polyisocyanate. In a first curing step, radiation curing takes place by means of UV light and in a second curing step the coating receives its final hardness as a result of OH/NCO crosslinking. The second curing step may be carried out at 130° C. to 200° C. or over several days at room temperature.

EP-A-540 884 describes a process for the preparation of a multi-layer coating for motor vehicle production line coating by application of a clear lacquer layer to a dried or cured base lacquer layer, wherein the clear lacquer coating compound contains binders which can be cured by free-radical and/or cationic polymerisation, and curing is carried out by means of high-energy radiation. After irradiation of the clear lacquer layer, the stoving process takes place, wherein base lacquer and clear lacquer are stoved together at, e.g., 80° C. to 160° C.

EP-A-247 563 describes clear lacquers which can be cured by UV radiation based on a poly(meth)acryloyl-functional compound, a polyol mono(meth)acrylate, a polyisocyanate, a light stabiliser and a photoinitiator. A part of the radiation-curing binders still contains hydroxyl functions here which may react with the polyisocyanate present and offer an additional curing option.

U.S. Pat. No. 4,668,529 describes a 1-pack primer surfacer coating compound for refinishing which can be cured by UV radiation. The binder is based on tripropylene glycol triacrylate and trimethylpropane triacrylate. In addition, an epoxy resin based on a bisphenol A diglycidyl ether is also present.

The object of the invention was to provide a process for the preparation of a multi-layer coating, more particularly refinishing which, in its overall composition, permits a substantial reduction in solvent emission and has short drying times. Moreover, very good water resistance and hardness and very good inter-layer adhesion and resistance of the base lacquer to partial dissolution by underlying and overlying lacquer layers are to be guaranteed.

The object is achieved by a process for the preparation of a multi-layer coating wherein a colour- and/or special effect-imparting base lacquer coating compound is applied to a substrate optionally precoated with a primer and/or primer surfacer coating compound and/or further coating compounds and a clear lacquer is then applied to the colour-and/or special effect-imparting base lacquer layer, characterised in that the colour- and/or special effect-imparting base lacquer coating compound used is one which contains binders which can be cured by free-radical and/or cationic polymerisation under the action of high-energy radiation.

It was surprising and could not have been derived from the prior art that the multi-layer coatings obtained with the process according to the invention exhibit the same high level of properties required for a coating, particularly refinishing, in terms of such properties as hardness, scratch resistance, resistance to water and chemicals, as multi-layer coatings which were prepared with conventional base lacquer/clear lacquer layers for vehicle (repair) coating. It was also surprising that various properties such as, e.g., inter-layer adhesion, resistance to partial dissolution by underlying or overlying lacquer layers, resistance to fuel, tree resin and pancreatin, could be substantially improved.

The colour- and/or special effect-imparting base lacquers that may be used in the process according to the invention are coating compounds which are crosslinked by free-radical and/or cationic polymerisation by means of high-energy radiation. The systems may be high-solids waterborne systems, for example, with a solids content from 50 to 95 wt. % which are present as an emulsion, but the systems may also be present in the solvent-based form. The systems may also, however, be 100% coating compounds which may be applied without solvents and without water.

The binders which can be cured by high-energy radiation which may be used in the base lacquers which can be used in the process according to the invention are all the conventional radiation-curing binders or mixtures thereof which are known to the skilled person and described in the literature. These are binders which can be crosslinked either by free-radical or by cationic polymerisation. In the case of the former, radicals are formed by the action of high-energy radiation on the photoinitiators, which radicals then initiate the crosslinking reaction. In the cationically curing systems, Lewis acids are formed from initiators by irradiation, which acids then in turn initiate the crosslinking reaction.

The free radical-curing binders may be, e.g., prepolymers or oligomers having olefinic double bonds in the molecule capable of undergoing free-radical polymerisation. Examples of prepolymers or oligomers are (meth)acrylic-functional (meth)acrylate copolymers, epoxy resin (meth)acrylates, polyester (meth)acrylates, polyether (meth)acrylates, polyurethane (meth)acrylates, amino(meth)acrylates, silicone (meth)acrylates, melamine (meth)acrylates, unsaturated polyurethanes or unsaturated polyesters. The number-average molecular mass (Mn) of said compounds is preferably 200 to 10000. The binders may be used individually or in mixture.

The prepolymers may be present in combination with reactive thinners, i.e. reactive polymerisable liquid monomers. The reactive thinners are generally used in amounts from 1 to 50 wt. %, preferably 5 to 30 wt. %, based on the total weight of prepolymer and reactive thinner. The reactive thinners may be mono-, di- or polyunsaturated. Examples of monounsaturated reactive thinners are: (meth)acrylic acid and esters thereof, maleic acid and half esters thereof, vinyl acetate, vinyl ether, substituted vinyl ureas, styrene, vinyl toluene. Examples of diunsaturated reactive thinners are: di(meth)acrylates such as alkylene glycol di(meth)acrylate, polyethylene glycol di(meth)acrylate, 1,3-butane diol di(meth)acrylate, vinyl (meth)acrylate, allyl (meth)acrylate, divinyl benzene, dipropylene glycol di(meth)acrylate, hexane diol di(meth)acrylate. Examples of polyunsaturated reactive thinners are: glycerine tri(meth)acrylate, trimethylolpropane tri(meth)acrylate, pentaerythritol tri(meth)acrylate, pentaerythitol tetra(meth)acrylate. The reactive thinners may be used individually or in mixture. Reactive thinners used in preference are diacrylates such as, e.g., dipropylene glycol diacrylate, tripropylene glycol diacrylate and/or hexane diol diacrylate.

The conventional binders known to the skilled person and described in the literature may be used as binders for cationically polymerisable systems. These may be, for example, polyfunctional epoxy oligomers containing more than two epoxy groups in the molecule. Examples include polyalkylene glycol diglycidyl ethers, hydrogenated bisphenol A glycidyl ethers, epoxy urethane resins, glycerine triglycidyl ethers, diglycidyl hexahydrophthalate, diglycidyl esters of dimeric acids, epoxidised derivatives of (methyl) cyclohexene such as, e.g., 3,4-epoxycyclohexylmethyl (3,4-epoxycyclohexane) carboxylate or epoxidised polybutadiene. The number average molecular mass (Mn) of the polyepoxide compounds is preferably less than 10000. Reactive thinners such as, e.g., cyclohexene oxide, butene oxide, butane diol diglycidyl ether or hexane diol diglycidyl ether may also be used.

The binder systems curing under the action of radiation contain photoinitiators. Suitable photoinitiators are, for example, those which absorb in the wave length range from 190 to 600 nm.

Examples of photoinitiators for free-radical curing systems are benzoin and derivatives, acetophenone and derivatives, such as, e.g., diacetoxyacetophenone, benzophenone and derivatives, thioxanthone and derivatives, anthraquinone, 1-benzoyl cyclohexanol, organophosphorus compounds such as acylphosphine oxides. The photoinitiators are used, for example, in amounts from 0.1 to 7 wt. %, preferably 0.5 to 5 wt. %, based on the sum of prepolymers capable of undergoing free-radical polymerisation, reactive thinners and photoinitiators. The photoinitiators may be used individually or in combination. Moreover, further synergistic components may be used, e.g., tertiary amines.

Photoinitiators for catonically curing systems are substances well known as onium salts which liberate Lewis acids photo lytically under the action of radiation. Examples thereof are diazonium salts, sulfonium salts or iodonium salts. Triaryl sulfonium salts are preferred. The photoinitiators for cadonically curing systems may be used in amounts from 0.5 to 5 wt. %, based on the sum of cationically polymerisable prepolymers, reactive thinners and initiators, individually or as mixtures.

Various free-radical curing systems, various catonically curing systems or free-radical and catonically curing systems may be combined with one another for the preparation of base lacquers which can be cured by high-energy radiation. Free-radical curing systems are used in preference. Preferred free-radical curing binders are those based on polyurethane (meth)acrylates, polyester (meth)acrylates and (meth)acrylic-functional poly(meth)acrylates. Those based on aliphatic polyurethane (meth)acrylates and/or aliphatic (meth)acrylic-functional poly(meth)acrylates are particularly preferred.

The base lacquers which may be used in the process according to the invention may also contain, in addition to the binders which can be cured by means of high-energy radiation, binders which cure or dry by other mechanisms. The amount of such additional binders is, for example, up to 50 wt. %, based on the UV-curing binder. For example, physically drying binders or chemically crosslinking binders may also o be present. The physically drying binders are, for example, polyurethane, polyurethane urea, polyester, polyester urethane and/or polyacrylic resins well known to the skilled person, which may optionally be present in combination with melamine resins or cellulose esters. They may also be modifications of the resins mentioned, e.g., acrylated or silicon-modified polyurethane resins and/or polyester resins or so-called Schoss polymers, i.e. acrylate copolymers prepared in the presence of, e.g., polyesters or polyurethanes. Examples of chemically crosslinking binders which may be used include two-component binder systems based on a hydroxy-functional and an isocyanate-functional component, a hydroxy-functional and an anhydride component or a polyamine- and an acryloyl-functional component. The binders which may be used in addition may be waterborne or solvent-based. The binder systems mentioned by way of example are known to the skilled person and described in detail in the literature. If further binders are used in the base lacquers in addition to the radiation-curing binders, those based on a hydroxy-functional and an isocyanate-functional component may be used in preference.

The base lacquer coating compounds which may be used in the process according to the invention contain colour- and/or special effect-imparting pigments. All the customary coating pigments of an organic or inorganic nature are suitable as colour-imparting pigments. Examples of inorganic or organic coloured pigments are titanium dioxide, micronised titanium dioxide, iron oxide pigments, carbon black, azo pigments, phthalocyanine pigments, quinacridone and pyrrolopyrrole pigments.

The special effect pigments are characterised in particular by a platelet-type structure. Examples of special effect pigments are: metallic pigments, e.g., of aluminium, copper or other metals; interference pigments such as, e.g., metal oxide-coated metallic pigments, e.g. titanium dioxide-coated or mixed oxide-coated aluminium, coated mica, such as, e.g., titanium dioxide-coated mica and graphite special effect pigments. UV-curing pigments and optionally fillers may also be used advantageously, for example, to improve the hardness. These are pigments/fillers coated with radiation-curing compounds, e.g., acrylic-functional silanes, which are thus incorporated in the radiation curing process.

The base lacquer coating compounds which may be used in the process according to the invention may contain fillers and/or conventional coating additives. The additives are the conventional additives which may be used in the coatings sector. Examples of such additives are levelling agents, e.g., based on (meth)acrylate homopolymers or silicone oils, rheology-influencing agents such as fine-particle silica or polymeric urea compounds, thickeners such as partially crosslinked polycarboxylic acid or polyurethanes, antifoaming agents, wetting and elasticising agents and light stabilisers.

Examples of fillers are silica, barium sulfate and talc. The additives and fillers are used in conventional amounts well known to the skilled person.

The base lacquers which may be used in the process according to the invention may be formulated without solvents. Their solids content in that case is 100 wt. %. The base lacquers, may, however, also contain small amounts of organic solvents and/or water. The solvents are conventional coatings solvents. These may originate from the preparation of the binders or be added separately. Examples of such solvents are monohydric or polyhydric alcohols, e.g., propanol, butanol, hexanol; glycol ethers or esters, e.g., diethylene glycol dialkyl ether, dipropylene glycol dialkyl ether, in each case with C1 to C6 alkyl, ethoxy propanol, butyl glycol; glycols, e.g., ethylene glycol, propylene glycol and oligomers thereof, esters, such as e.g., butyl acetate, amyl acetate, alkyl pyrrolidone, e.g., N-methylpyrrolidone and ketones, e.g., methyl ethyl ketone, acetone, cyclohexanone; aromatic or aliphatic hydrocarbons, e.g., toluene, xylene or straight-chain or branched aliphatic C6 to C12 hydrocarbons.

The colour- and/or special effect-imparting base lacquer layer is applied to optionally precoated substrates in the process according to the invention. Preferred substrates are metal or plastic substrates. The base lacquers are applied preferably to conventional primer, primer surfacer or other intermediate layers of the kind used for multi-layer coating in the motor vehicle sector. More particularly, they are applied to an already precoated vehicle body or parts thereof within the context of vehicle repair coating. Application is by known methods, spray application being particularly preferred.

The base lacquer may be applied, for example, to conventional solvent-based or waterborne primer surfacer, primer or other intermediate layers. The primer surfacer, primer or intermediate layers may be already cured or pre-dried or partially dried. That is, the base lacquer may be applied e.g., to an existing coating, a cured refinishing coating, a refinishing coating of the type described above by way of example pre-dried by IR radiation, or wet-in-wet, optionally after a short flash-off.

The coating compounds used for the preparation of primer surfacer, primer or intermediate layers may be based on the conventional and suitable physically drying or chemically crosslinking binder systems for vehicle finishing. Examples of physically drying binders are solvent-based or waterborne polyurethane, polyurethane urea, polyester, polyester urethanes or polyacrylate resins and modifications thereof. Examples of solvent-based or waterborne chemically crosslinking binders are systems based on oxidation-drying resins, peroxide-curing unsaturated polyesters and acid-curing polyvinylbutyrals and based on hydroxyl group-containing binders which can be crosslinked with isocyanate-, aminofunctional or anhydride-functional components, based on epoxide/polyamine or acryloyl/polyarnine systems.

After application of the base lacquer which may be used in the process according to the invention to one of the substrates mentioned above, the base lacquer is exposed to high-energy radiation, preferably UV radiation, optionally after a short flash-off phase. UV radiation sources are preferably those with emissions in the wave length range from 180 to 420 nm, particularly from 200 to 400 nm. Examples of such UV radiation sources are optionally doped mercury high pressure, medium pressure and low pressure radiators, gas discharge tubes such as, e.g., xenon low pressure lamps, pulsed and non-pulsed UV lasers, UV spotlights such as, e.g., UV-emitting diodes and black light tubes. Irradiation takes place preferably with pulsed UV radiation. In that case, the particularly preferred source of radiation used is so-called high-energy electron flash devices (UV flash lamps for short). Preferred UV flash lamps emit light of a wave length from 200 to 900 nm with a maximum at about 300 to 500 nm. The UV flash lamps contain preferably a plurality of flash tubes, for example, quartz tubes filled with inert gas, such as xenon. The UV flash lamps should bring about an illuminance of at least 10 megalux, preferably from 10 to 80 megalux per flash discharge on the surface of the coating to be cured. The electrical output per flash discharge should preferably be 1 to 10 kJoule. The UV flash lamps are preferably transportable devices which may be positioned directly in front of the defect to be touched up. Suitable UV flash lamps are described, for example, in WO-A-9411123 and in EP-A-525 340. UV flash lamps are available commercially. Depending on the application conditions and requirements, one or more UV flash lamps may be used.

The base lacquer layers may be cured by a plurality of successive flash discharges. In preference, 1 to 40 successive flash discharges are released. The distance of the UV flash lamp from the substrate surface to be irradiated may be 5 to 50 cm, preferably 10 to 25 cm, particularly preferably 15 to 20 cm. The screening of the UV lamps to avoid the escape of radiation may be carried out, e.g., by using an appropriately lined protective housing around the transportable lamp unit or with the aid of other safety measures known to the skilled person.

The irradiation time is in the region of a few seconds overall, for example, in the region of 3 milliseconds to 400 seconds, preferably from 4 to 160 seconds, depending on the number of flash discharges selected. The flashes may be released, for example, about every 4 seconds. The UV flash lamps may be ready for operation at any time, i.e. they do not require a warm-up period and may be kept switched off between two somewhat staggered curing or irradiation operations, without any time being lost by a warm-up phase during the new irradiation process.

If, in addition to the radiation-curing binders, other physically drying and/or chemically crosslinking binders are contained in the base lacquers which may be used according to the invention, the temperatures generated on the coating by means of UV irradiation (UV flash lamps) are generally sufficient to cure the binders additionally present. A separate curing step is not necessary.

In the process according to the invention, a clear lacquer coating is applied to the base lacquer layer either after full curing or wet-in-wet, optionally after a short flash-off. Suitable clear lacquers are all the conventional solvent-based or waterborne clear lacquers in vehicle coating, particularly refinishing, and known to the skilled person.

Examples thereof are solvent-based or waterborne clear lacquers based on hydroxyl group-containing and/or amino group-containing binders and polyisocyanate crosslinking agents and based on amino group-containing and acryloyl-functional binders. Curing of the clear lacquer layer may be carried out at room temperature or by forced drying at, for example, 40° C. to 80 ° C.

In preference, solvent-based or waterborne clear lacquer coating compounds based on hydroxyl group-containing binders and polyisocyanate crosslinking agents are used in the process according to the invention.

In particular preference, free-radical curing aliphatic polyurethane (meth)acrylates and/or aliphatic (meth)acrylic-functional poly(meth)acrylates are used in the base lacquer in the process according to the invention and the clear lacquers used are solvent-based or waterborne clear lacquers based on hydroxyl group-containing binders and polyisocyanate crosslinking agents.

A further preferred embodiment of the process according to the invention consists in using a clear lacquer which contains binders which can be cured by high-energy radiation. The binders which can be cured by high-energy radiation are, for example, the radiation-curing binders already mentioned above which may be used in the base lacquer. Binders which can be cured by high-energy radiation and based on aliphatic polyurethane (meth)acrylates and/or (meth)acrylic-functional poly(meth)acrylates are used in particular preference in the base lacquer and in the clear lacquer. The clear lacquer may be applied to the uncured base lacquer wet-in-wet, optionally after a brief flash-off. Irradiation with UV rays then takes place, the base lacquer and clear lacquer being cured together in one operating step. It is also possible, however, initially to cure the base lacquer partially or completely with the appropriate number of flash discharges required, then to apply the clear lacquer and to expose it to UV radiation.

If radiation-curing clear lacquers are used in the process according to the invention, special coated transparent fillers may be advantageously contained in addition to the conventional additives for a clear lacquer, in order to increase the scratch resistance. Suitable fillers in this case are, for example, micronised aluminium oxide or micronised silica. Said transparent fillers are coated with compounds containing UV-curing groups, e.g., with acrylic-functional silanes and are thus incorporated during radiation curing of the clear lacquer. The fillers are available as commercial products, e.g., under the name AKTISIL®.

Multi-layer coatings with great hardness, good scratch resistance and high gloss are obtained with the process according to the invention. The individual lacquer layers exhibit very good inter-layer adhesion and resistance to partial dissolution by underlying and overlying lacquer layers. The latter properties are particularly well pronounced if the clear lacquer layer, as well as the base lacquer in the multi-layer composition, also contains binders which can be cured by high-energy radiation, and if the same radiation-curing binders and/or reactive thinners are used for both lacquer layers.

The coatings obtained with the process according to the invention comply in other respects with the requirements of a refinishing lacquer composition in the automotive coating sector. Drying or curing of the coatings, particularly of the base lacquer/clear lacquer composition, takes place in a much shorter period of time compared with refinishing lacquer compositions dried or cured in the usual way. For example, it is possible to complete the drying or curing process for the base lacquer/clear lacquer composition within about 5 to 15 minutes, preferably 5 to 10 minutes.

A further advantage of the process according to the invention is that, in cases where a clear lacquer has to or should be dispensed with in the multi-layer composition for technological or economic reasons, e.g., during the coating of vehicle interiors such as engine compartment, boot, door rebates or during the coating of textured plastics surfaces, the clear lacquer can be omitted without difficulty. The base lacquer cured by high-energy radiation readily fulfils the function of the clear lacquer, e.g., in terms of hardness and scratch resistance, without any modification.

The process according to the invention may be used advantageously in vehicle repair coating, particularly of vehicle parts, relatively small defects and for spot repairs.

The invention will be explained on the basis of the examples below.

EXAMPLES

Preparation of a Base Lacquer

The following components were mixed together and dispersed for a few minutes with a high-speed stirrer (all data are based on the weight):

476 parts of a commercial aliphatic polyurethane acrylate 13 parts of a commercial levelling agent 223 parts of titanium dioxide 25 parts of a mixture of commercial photoinitiators (arylphosphine oxide and acetophenone derivatives)

110 parts of butyl acetate.

Preparation of a Clear Lacquer

The following components were mixed together and dispersed for a few minutes with a high-speed stirrer (all data are based on the weight):

114 parts of a commercial aliphatic polyurethane acrylate 0.3 parts of a commercial levelling agent 7.2 parts of a mixture of commercial photoinitiators (arylphosphine oxide and acetophenone derivatives)

44 parts of butyl acetate 1 part of a commercial light stabiliser (HALS type)

1 part of a commercial UV absorber (benztriazole type)

Preparation of a Multi-layer Composition

The base lacquer prepared as described above was applied in a resulting dry film layer thickness of about 60 $\mu$m to cataphoretically primed steel sheets coated with conventional solvent-based 2-pack polyurethane primer surfacers. After a brief flash-off time at room temperature, the base lacquer layer is exposed to irradiation by a UV flash lamp (3500 Ws). Said base lacquer layer is irradiated with 20 flashes (about 80 s).

In a first variant, the clear lacquer prepared as described above is then applied in a resulting dry film layer thickness of about 60 $\mu$m. After a brief flash-off time at room temperature, the clear lacquer layer is exposed to irradiation by a UV flash lamp (3500 Ws). Said clear lacquer layer is irradiated with 20 flashes (about 80 s).

In a second variant, the cured base lacquer is overcoated with a solvent-based conventional 2-pack polyurethane clear lacquer and cured in the usual way.

The results of the coating-related tests are shown below:

| Property Resistance (1) to: | Multi-layer composition according to the invention of | |
| --- | --- | --- |
| | UV base lacquer/ UV clear lacquer | UV base lacquer/2-pack clear lacquer |
| Fuel | 0 | 3–4 |
| Tree resin | 0–1 | 2 |
| Pancreatin | 3 | 4 |
| HCl | 0 | 0 |
| $H_2SO_4$, 10% | 0 | 0 |
| NaOH | 0 | 0 |
| Moisture/heat test (2) (3) | 0/0 | |
| Adhesion (4) | 0–1 | |
| Adhesion (4) after moisture/heat test (2) | 0–1 | |

(1) VDA test according to the VDA test sheet 621/612

(2) Moisture/heat test according to DIN 50017

(3) Assessment of blistering according to DIN 53209

(4) Cross-cut in accordance with DIN 53151

What is claimed is:

1. A process for forming a multi-layer finish having an automotive quality appearance on a substrate selected from the group consisting of automotive bodies and automotive parts comprising the steps of:

1) applying a coating layer selected from the group consisting of a primer coating layer and a primer surfacer coating layer comprising a film forming binder and pigments to a substrate and curing the layer at an elevated temperature;

2) applying a base lacquer coating layer onto the coating layer applied in step 1), wherein the base lacquer coating layer comprises a color-imparting layer and a binder selected from the group consisting of a binder curable exclusively by free radical polymerization, a binder curable exclusively by cationic polymerization and a mixture of binders one curable by free radical polymerization and a second curable by cationic polymerization;

3) curing the base lacquer coating layer with UV energy radiation;

4) applying a clear lacquer coating layer containing a binder over the base lacquer coating layer wherein the binder of the clear lacquer coating is selected from the group consisting of a binder curable exclusively by free radical polymerization, a binder curable exclusively by cationic polymerization and a mixture of binders curable by free radical polymerization and a second curable by cationic polymerization; and 5) curing the clear lacquer coating layer with UV energy radiation to from a finish having an automotive quality appearance.

2. The process of claim 1 in which the high energy radiation is pulsed UV radiation that is used to cure the base coating lacquer layer and the clear coating lacquer layer.

3. The process of claim 1 used in the repair of multi-layer lacquer coated automotive bodies or parts thereof.

4. A process for forming a multi-layer finish having an automotive quality appearance on a substrate selected from the group consisting of automotive bodies and automotive parts comprising the steps of:

1) applying a coating layer selected from the group consisting of a primer coating layer and a primer surfacer coating layer comprising a film forming binder and pigments to a substrate and curing the layer at an elevated temperature;

2) applying a base lacquer coating layer onto the coating layer applied in step 1), wherein the base lacquer coating layer comprises a color-imparting layer and a binder selected from the group consisting of a binder curable exclusively by free radical polymerization, a binder curable exclusively by cationic polymerization and a mixture of binders one curable by free radical polymerization and a second curable by cationic polymerization;

3) applying a clear lacquer coating layer containing a binder over the base lacquer coating layer wherein the binder of the clear lacquer coating is selected from the group consisting of a binder curable exclusively by free radical polymerization, a binder curable exclusively by cationic polymerization and a mixture of binders curable by free radical polymerization and a second curable by cationic polymerization; and 4) curing the base lacquer coating layer and the clear lacquer simultaneously with UV energy radiation to form a finish having an automotive quality appearance.

5. The process of claim 4 in which the high energy radiation is pulsed UV radiation that is used to cure the base coating lacquer layer and the clear coating lacquer layer.

6. The process of claim 4 used in the repair of multi-layer lacquer coated automotive bodies or parts thereof.

7. A process for forming a multi-layer finish having an automotive quality appearance on a substrate selected from the group consisting of automotive bodies and automotive parts comprising the steps of:

1) applying a coating layer selected from the group consisting of a primer coating layer and a primer surfacer coating layer comprising a film forming binder and pigments to a substrate and curing the layer at an elevated temperature;

2) applying a base lacquer coating layer over the coating layer applied in step 1), wherein the base lacquer coating layer comprises a color-imparting layer and a binder selected from the group consisting of a binder curable exclusively by free radical polymerization, a binder curable exclusively by cationic polymerization and a mixture of binders one curable by free radical polymerization and a second curable by cationic polymerization;

3) curing the base lacquer coating layer with UV energy radiation;

4) applying a clear lacquer coating layer comprising a film forming binder curable by elevated temperatures over the base lacquer coating layer; and 5) curing the clear layer at an elevated temperature to form a finish having an automotive quality appearance.

8. The process of claim 7 wherein the high energy radiation is pulsed UV radiation used to cure the base lacquer layer.

9. The process of claim 7 wherein the binder of the base lacquer coating is selected from the group consisting of aliphatic polyurethane (meth)acrylates and aliphatic (meth)acrylic-functional (meth)acrylate copolymers, each being curable by free radical polymerization.

10. The process of claim 7 used in the repair of multi-layer lacquer coated automotive bodies or parts thereof.

* * * * *